United States Patent [19]

Carter

[11] Patent Number: 4,600,706

[45] Date of Patent: * Jul. 15, 1986

[54] ANTI-FUNGAL FEED COMPOSITIONS CONTAINING NATAMYCIN

[76] Inventor: A. F. Carter, 705 E. Highpoint, Springfield, Mo. 65807

[*] Notice: The portion of the term of this patent subsequent to Aug. 20, 2002 has been disclaimed.

[21] Appl. No.: 552,771

[22] Filed: Nov. 17, 1983

[51] Int. Cl.$^4$ ...................... A61K 31/71; C07H 17/08
[52] U.S. Cl. ........................................ 514/31; 536/6.5
[58] Field of Search ......................... 424/180; 514/31; 536/6.5

[56] References Cited

U.S. PATENT DOCUMENTS

| | | | |
|---|---|---|---|
| 2,903,356 | 9/1959 | Lampen et al. | 424/180 |
| 3,892,850 | 7/1975 | Struyk et al. | 424/119 |
| 3,916,027 | 10/1975 | Taylor | 424/329 |
| 3,945,993 | 3/1976 | Schaffner et al. | 536/6.5 |
| 3,957,754 | 5/1976 | Aszalos et al. | 536/6.5 |
| 4,536,494 | 8/1985 | Carter | 514/31 |

OTHER PUBLICATIONS

Lampen et al., "Bull. Res. Counc. of Israel", vol. 11A4, 1963, pp. 286-291.
De Kruijff et al., "Biochimica et Biophysica Acta." 339, 1974, pp. 30-43.
"The Merck Index" 10th Ed., 1985, p. 922.
Clark et al., Pimaricin, "A New Food Fungistat," *Microbial Inhibitors in Food, Fourth International Symposium on Food Microbiology*, 1964, at Swedish Institute for Food Preservation Research, pp. 167-184.
Morris et al., "Pemaricim-What is it?" *Cultured Dairy Products Journal*, vol. 13, No. 3, pp. 22-24, Aug. 1978.
The Merck Index, Merck & Co., Inc., Rahway, N.J., (1976), p. 967.
Raab, Wolfgang P., *Natamycin (Pimaricin)*, Georg Thieme Publishers Stuttgart, (1972), pp. 18-19.
Abstract 41805, Ene-Popescu, Constanta, (Inst. Med. Farm., Clin. Il-a Dermatol., Bucuresti, Rom.).
Abstract 41800, Jones, Dan B. (Vanderbilt Univ. Med. Cent., Nashville, Tenn. 37232, USA).
British National Formulary, pp. 181, 283, 302.
Federal Register, vol. 43, No. 229, Tuesday, Nov. 28, 1978, Sections 172.155 and 449.40.
Brik, Harry, Analytical Profiles of Drug Substances, Acadamic Press, Inc. (1981), pp. 513, 517.
Food and Agriculture Organization of the United Nations, FAO Report No. 45, WHO Report No. 430, Rome (1969).
Naproxen, Official Monographs, USP XX, p. 198, 834, 210.
Mizuno et al, "The Chemotherapy of Vulvovaginal Mycosis", Advances in Antimicrobial and Antineoplastic Chemotherapy, vol. I/1, p. 239.
Levinskas et al, "Acute and Chronic Toxicity of Primaricin", *Toxicology and Applied Pharmacology* 8, 97-109 (1966).
Sellam et al, "Temperatures Differences, Moisture Transfer and Spoilage in Stored Corn", *Feedstuffs*, Sep. 6, 1976, p. 28.
Lovett, J. Agr. Food Chem., vol. 20, No. 6, 1972.
Mislivec et al, "Incidence of Toxic and Other Mold Species and Genera in Soybeans", *Journal of Food Protection*, vol. 40, No. 5, pp. 309-312 (May, 1977).
Azzouz et al, "Comparative Antimycotic Effects of Selected Herbs . . . ", *Journal of Food Protection*, vol. 45, No. 14, pp. 1298-1301 (Dec. 1982).
Food Additives Tables, Elsevier Scientific Publishing Company, (1975), p. IX-42.
Microbial Inhibitors in Food, Food Microbiology Symposium, Jun. 1-5, 1964, Goteborg, Sweden, pp. 185, 186.
Microbial Inhibitors in Food, Food Microbiology Symposium, Jun. 1-5, 1964, Goteborg,, Sweden, pp. 167-185.
Ray et al., "Preventing Growth of Potentially Toxic Molds Using Antifungal Agents", *Journal of Food Protection*, vol. 45, No. 10, pp. 953-963 (Aug. 1982).
Evaluation of Certain Food Additives, WHO report No. 599, FAO Report No. 1, Geneva, 1976.
Delvocid ®, For the Prevention of Mold on Food Products, Product Bulletin Del-03/82.10.Am.10, GGB Fermentation Industries Inc., pp. 3-6.
Davis et al, "Toxigenic Fungi in Food", *Applied Microbiology*, Jul. 1975, pp. 159-161.
Abstract No. 89:58456g, Incidence and Control of Mycotoxin Producing Molds in Domestic and Imported Cheese, Bullerman, L. B. (Dep. Food Sci. Technol., Univ. Nebraska, Lincoln, Nebr.).
Abstract No. 97564, Devries, G. A. (Centr. Bur. Schimmelcult., Baarn, Neth.).
Bullerman, "Significance of Mycotoxins to Food Safety and Human Health", Journal of Food Protection vol. 42, No. 1, pp. 65-86 (Jan. 1979).
Zeitschrift Fur Lebensmittel-Untersuchung Und-Forschung, J. F. Bergmann, Munchen (1973), pp. 179-186.

*Primary Examiner*—Johnnie R. Brown
*Attorney, Agent, or Firm*—Lowe, Price, Leblanc, Becker & Shur

[57] ABSTRACT

An animal feed composition which comprises a conventional animal feed and an antifungal-effective amount of natamycin. The feed composition may comprise natamycin in a range of about 0.000055 to 0.011 weight percent. A premix for incorporation into such animal feeds preferably comprises about 2 to 25 grams of natamycin admixed with about one pound of an inert carrier, such as rice hulls or calcium carbonate. One pound of premix is added to about one ton of the conventional animal feed.

6 Claims, No Drawings

ANTI-FUNGAL FEED COMPOSITIONS CONTAINING NATAMYCIN

BACKGROUND OF THE INVENTION

1. Field of the Invention

The present invention relates to animal feed compositions incorporating natamycin, an antifungal ingredient. The invention also relates to methods for producing and using such feed compositions.

2. Related Art

Mycotoxin is a well-known term that generally describes compounds produced by molds, or fungi, that produce toxic effects in other organisms. Acute diseases caused by mycotoxins are called mycotoxicoses. Outbreaks of mycotoxicoses have afflicted humans as well as domestic animals since antiquity.

A human disease known as Alimentary Toxic Aleukia was first detected in Russia during World War II, and it was caused by the human consumption of moldy grain, resulting in mortality rates as high as sixty percent (60%) in some of the affected areas. Diseases in domestic animals, such as horses, have also been recorded, caused by feeding them moldy hay. In the early 1950's in Japan, a condition known as "yellowed rice" was identified as the severe liver damage to animals ingesting fungus-contaminated rice. This disease is caused by a variety of Penicillium species. A discussion of the significance of mycotoxins is contained in Bullerman's, "Significance of Mycotoxins to Food Safety and Human Health", *Journal of Food Protection*, Volume 42, page 65, 1979.

Other mycotoxicoses have been reported in sheep in New Zealand, resulting in severe liver damage and skin disorders. Further outbreaks produced by moldy feed have been reported in horses, cattle, poultry, and swine. In England, in 1960, a severe toxic outbreak of a mycotoxicosis known as "Turkey X Disease" was traced to moldy ground meal that had been heavily infested with a common mold *Aspergillus flavus*. Analysis of the mycotoxin in this feed resulted in the discovery of several compounds that were named aflatoxins and which are now known to be carcinogenic.

Thus, it has been recognized that fungus growth in animal feedstuffs may result in mycotoxicoses in valuable livestock. Furthermore, even if the fungus in the feedstuff is killed, fungal toxins that are present will remain, representing a continuing hazard. Several authorities have suggested various prophylactic steps. For example, recognizing the importance of feed as a source of toxigenic fungi, one author found it imperative that feeds and feed handling equipment be kept dry to prevent fungal growth and toxin formation (Lovett, *Journal of Agriculture and Food Chemistry*, Volume 20, 1972). This approach, while helpful, appears to be inadequate, given the natural moisture content that is present in all animal feeds.

Another approach to the control of mycotoxins is through the use of antifungal or antimycotic compounds. Such agents are chemicals that prevent or interfere with mold growth and also, in some instances, with the production of the mycotoxins themselves. For example, U.S. Pat. No. 4,126,701 discloses an animal and poultry feed which contains a medicinal agent, gentian violet, that is a selective fungicidal mold inhibitor for *Candida Albicans*. A suggested feed composition is formulated by adding a premix concentrate containing gentian violet along with medically inert ingredients to a conventional feed composition. U.S. Pat. No. 3,916,027 discloses a related premix concentrate also utilizing gentian violet as a method of treating *Candida albicans* infections in poultry.

Fungal infections and mycotoxins are not limited to domestic animals nor only transmitted through contaminated feedstuffs. As noted above, mycotoxicoses have been reported in human populations. Fungi produce a variety of human clinical pathologies through infections as well as through consumption of fungus-contaminated foods. Certain antifungal agents have been used to treat or prevent the growth of fungus both clinically and on foods.

One such antifungal agent is natamycin, also known as pimaricin or tennectin. This compound was isolated in the late 1950's from the fermentation broth of a culture of *Streptomyces natalensis*. (See Struyk et al., *Antibiotics Annual*, 1957–1958, page 878.) This organism was discovered in a soil sample taken from near Pietermaritzburg in South Africa. Natamycin is also produced by *Streptomyces chattanoogensis*.

Natamycin is a creamy white, odorless, tasteless, practically insoluble crystalline amphoteric powder. It belongs to the polyene macrolide or macrocyclic lactone group of compounds. (See generally, Clark et al. "Pimaricin, A New Food Fungistat", *Microbial Inhibitors in Food*, 4th International Symposium on Food Microbiology 1964 at the Swedish Institute for Food Preservation Research.) In low concentrations, natamycin is a potent inhibitor of fungal microorganisms. It is reported to have been tested in vitro on over 500 fungal organisms and with very positive effects.

Natamycin is relatively stable when in a dry state or when mixed with dry diluents. However, the molecule is sensitive to ultraviolet light, oxygen, or extreme pH values. It is relatively insoluble in water in which its solubility is of the order 0.005–0.010 weight/weight percent. Additionally, even in solution, natamycin is rather unstable. Aqueous solutions of 16 mcg/ml of natamycin became microbiologically inactive after 24 hour exposure to light. Inactivation of natamycin by light, peroxides or oxygen proceeds at the fastest rate in solution or suspension. Natamycin is also sensitive to heavy metals, and it may lose up to 75% of its effectivity in 4–5 hours in their presence.

Natamycin has been used to treat several human clinical fungal infections, such as Candidiasis and Trichomoniasis. As reported in the British National Formulary, natamycin is sold under the trade name "Pimafucin ®" produced by Brocades in oral suspension, suspension for inhalation, cream and vaginal tablet formulations. Natamycin has also been used for various epidermal fungal infections such as corneal ulcers.

Natamycin has also been of interest in the treatment of food products because it is highly active against yeasts and molds, as opposed to bacterial (see Morris and Hart, "Pimaricin—What is It?", *Culture Dairy Products Journal*, Volume 13, page 22, 1978.) Reportedly, natamycin has been applied to food products in several ways. It has been added in dry form to liquids, slurries, pastes and semisolids when adequate mixing can be accomplished, or the pure natamycin can be mixed with one or more of the dry ingredients and then added to a given food product. Solid foods requiring surface protection can be dipped, misted, fogged or dusted with a solution or suspension of natamycin. Additionally, it has been suggested that protection from yeast and molds may be achieved in solid food by incorporating natamycin homogeneously into the food itself. (See, Clark et al. cited above.)

Natamycin has also been used to retard spoilage of dressed poultry, to protect cottage cheese, and has been widely used in the dip-treatment of cheeses to coat them with the fungicide which is absorbed slightly, and dries to form a solid, surface coating. Various other reports suggest that natamycin is effective in the treatment of fresh berries, tomatoes, strawberries and raspberries. These reports indicate that natamycin has an antiyeast activity when added to wines, and various fruit juices, such as apple juice or orange juice. (See, Morris and Hart, and Clark, cited above.) Natamycin is also used on meat products such as sausage.

SUMMARY OF THE INVENTION

In a composition aspect, the present invention relates to an animal feed composition comprising a conventional animal feed and an antifungal-effective amount of natamycin. In a further composition aspect, this invention relates to an animal feed comprising about 0.000055 to 0.011 weight percent of natamycin in combination with a suitable inert carrier with the balance of the composition being a conventional animal feed.

In yet another composition aspect, the invention relates to a feed composition comprising about 70-93 weight percent of cracked or ground grain, having an average particle size of about 1/32 of an inch, or less, to about ⅛th of an inch; about 7-30 weight percent of water; and about 0.000055 to 0.011 weight percent of natamycin.

A further composition aspect of the present invention relates to a premix for incorporation into a conventional animal feed, most preferably comprising about 8 to 15 grams of natamycin admixed with about one to three pounds of an inert carrier per ton of feed. The inert carrier may be formed of such ingredients as rice hulls or calcium carbonate.

In a method of use aspect, the present invention relates to a method for treating animal feed, comprising a dry blending of about 0.000055 to 0.011 weight percent of natamycin combined with a suitable premix carrier with a conventional animal feed.

DETAILED DESCRIPTION OF THE PREFERRED EMBODIMENTS

The present invention is generally directed to a feed composition that includes natamycin as a fungal inhibitor. Animal feed is largely composed of grain and cereal products, but may also include meat by-products as a minor ingredient. Additionally, animal feed may include citrus pulp and grape hulls, either or both being present at less than about 5% by weight. Animal feed can also include added fats, minerals and vitamins, such as riboflavin, and trace metals.

Animal feed is generally formed by cracking or grinding grain rather than by incorporating the intact grain particles. These ground or cracked particles in the feed are roughly 1/100 of their original grain size. Animal feeds are composed of many different particles, typically in a range between about 1/32 of an inch, or less, to ⅛th of an inch in diameter. Additionally, the cracking process exposes higher moisture and different nutrient concentrations than are typically present at the surface of the grain particle which usually has a hull or other coating. Thus the increased moisture content of conventional feeds further decreases the stability of natamycin according to the literature in this art.

Feed is usually exposed to light during its manufacture. It is then typically stored in dark bins with lids to keep out moisture. However, the moisture content of feed ranges from 10-30%. Additionally, in use, uneaten leftover feed is thoroughly exposed to light, as it is retained in the pans or bins which are typically found in automated feed systems. Thus, some feed may be retained for a week or more before it is consumed in an environment of high moisture and with exposure to ultraviolet and visible light rays. Typically, 90% of the samples of untreated feed from feed troughs exhibit fungus whereas only about 50% of samples taken from feed storage bins exhibit fungus. In contrast, about 10% of feed samples at the feed mill show the presence of fungus after processing to that stage.

Surprisingly, I have found that natamycin when added to animal feedstuffs exhibits a significant antifungal activity despite the extended presence of moisture which tends to inactivate the compound. Natamycin, as indicated above, is quickly inactivated upon exposure to ultraviolet light of certain wave lengths, and in the presence of riboflavin, visible light also inactivates the natamycin. This theoretically also renders natamycin relatively less stable in feed. The presence of heavy metals in trace amounts would be expected to still reduce natamycin stability.

The following experiments demonstrate the unexpected efficacy of natamycin in inhibiting the growth of mold in feed samples:

EXAMPLE I

Visual observation of Mold Growth in Feed Containing 33% and 53% Moisture

TREATMENT GROUPS

A—control
B—5 ppm active material
C—10 ppm active material
D—20 ppm active material

PROCEDURE

A 16% swine grower feed with an initial moisture level of approximately 13% was used. For each of treatments B, C and D the appropriate amount of natamycin was weighed and suspended into 10 ml distilled water; 444 grams of feed was weighed and placed into a food processor, and the 10 ml of solution was added slowly while feed was mixing. After all the solution had been added, feed was mixed for an additional 30 seconds. For treatment A, 10 ml of plain distilled water was added. Feed was separated into 6 aliquots in 10×150 mm petri dishes, 3 each in the dark at room temperature in a sealed bag and 3 each at 35°-37° C. in a sealed bag. At 11 days post-initiation, two 5 gm samples were removed from one of the aliquots at each incubation temperature for each treatment. One ml distilled water was added to one sample and two ml distilled water was added to the other sample. This resulted in a 33% and 53% moisture level, respectively, in the feed. The five gram samples of feed and water were mixed with an applicator stick and then transferred to an 18×150 mm test tube with kaput. Samples were incubated at their previous incubation temperature. Samples were observed twice daily for mold formation and color differences.

RESULTS

No color differences were observed on any day post-addition of water. Differences in mold formation are shown in Tables 1 and 2 for 33% and 53% moisture in feed, respectively. A scoring system of 1 to 5 was utilized to indicate relative amounts of mold formation among the treatments.

TABLE 1

Visual scoring of mold formation in 33% feed

| Incubation Temperature | Treatment | Visual score on days post-addition of water | | | | | | |
|---|---|---|---|---|---|---|---|---|
| | | 1 | 2 | 3 | 4 | 5 | 6 | 7 |
| Room Temperature | A | 0 | 2 | 2 | 3 | 3 | ND* | 3 |
| | B | 0 | 2 | 2 | 3 | 3 | ND | 3 |
| | C | 0 | 1 | 2 | 3 | 3 | ND | 3 |
| | D | 0 | 1 | 1 | 2 | 2 | ND | 3 |
| 35–37° C. | A | 0 | 1 | 2 | 3 | 3 | ND | 3 |
| | B | 0 | 2 | 2 | 3 | 3 | ND | 3 |
| | C | 0 | 1 | 2 | 3 | 3 | ND | 3 |
| | D | 0 | 0 | 1 | 2 | 3 | ND | 3 |

*ND = Not done.

TABLE 2

Visual scoring of mold formation in 53% feed.

| Incubation Temperature | Treatment | Visual score on days post-addition of water | | | | | | |
|---|---|---|---|---|---|---|---|---|
| | | 1 | 2 | 3 | 4 | 5 | 6 | 7 |
| Room Temperature | A | 0 | 2 | 2 | 3 | 4 | ND* | 4 |
| | B | 0 | 1 | 3 | 4 | 4 | ND | 4 |
| | C | 0 | 1 | 3 | 4 | 4 | ND | 4 |
| | D | 0 | 0 | 1 | 3 | 4 | ND | 4 |
| 35–37° C. | A | 0 | 2 | 4 | 4 | 4 | ND | 4 |
| | B | 0 | 1 | 3 | 4 | 4 | ND | 4 |
| | C | 0 | 0 | 2 | 4 | 4 | ND | 4 |
| | D | 0 | 0 | 1 | 3 | 4 | ND | 4 |

*ND = Not done.

EXAMPLE II

Visual Observation of Mold Growth in Feed Containing 25% Moisture

TREATMENT GROUPS

A—control
B—10 ppm active material
C—20 ppm active material
D—40 ppm active material

PROCEDURE

A 16% swine grower feed with an initial moisture level of approximately 13% was used. For each of treatments B, C, and D the appropriate amount of natamycin was weighed and suspended into 10 ml distilled water; 444 gm feed was weighed and placed into a food processor. To bring the moisture to 22.7%, 43 ml distilled water was added and mixed, then the 10 ml solution was added (bringing moisture level to 25%) and feed was mixed for one minute. For treatment A, 10 ml of plain distilled water was added. For each treatment, 5 gm were transferred to two 18×150 test tubes, approximately 30 gm were transferred to two 125 ml E-flasks, approximately 0.5 gm was placed into two 15×100 mm petri dishes and two 15×150 mm petri dishes were filled as full as possible. One set of each of the above was incubated at room temperature and the other at 35°–37° C. Samples were observed daily.

RESULTS

Stereoscope observations of the 0.5 gm samples revealed no differences among the treatments at either room temperature or 35°–37° C.

The 30 gm sample in E-flask was used to observe for clumping of the feed and/or mold formation. No differences were noted from the treatment at 35°–37° C. except that post-initiation day 9 treatment D feed was forming mold. No mold was observed in samples held at room temperature, however, differences were seen in "clump" formation (Table 3). On post-initiation day 4 all feed samples were starting to stick together.

A visual comparison of mold formation in the respective feed samples held in test tubes and in petri dishes are presented in Tables 4 and 5, respectively. Comparison of mold formation was easier to distinguish in petri dishes.

TABLE 3

Visual comparison of feed (25% moisture) clumping at room temperature.

| Treatment | 1 | 2 | 3 | 4 | 5 | 6 | 7 | 8 | 9 |
|---|---|---|---|---|---|---|---|---|---|
| A | 0 | 0 | 0 | 0 | 3 | 3 | ND* | 3 | 3 |
| B | 0 | 0 | 0 | 0 | 3 | 3 | ND | 3 | 3 |
| C | 0 | 0 | 0 | 0 | 2 | 3 | ND | 3 | 3 |
| D | 0 | 0 | 0 | 0 | 1 | 1 | ND | 1 | 1 |

*Not done.

TABLE 4

Visual scoring of mold formation in 25% moisture feed held in test tubes.

| Incubation Temperature | Treatment | Visual score on days post-addition of water | | | | | | | | |
|---|---|---|---|---|---|---|---|---|---|---|
| | | 1 | 2 | 3 | 4 | 5 | 6 | 7 | 8 | 9 |
| Room Temperature | A | 0 | 0 | 0 | 0 | 0 | 3 | ND* | 4 | 4 |
| | B | 0 | 0 | 0 | 0 | 0 | 3 | ND | 4 | 4 |
| | C | 0 | 0 | 0 | 0 | 0 | 3 | ND | 4 | 4 |
| | D | 0 | 0 | 0 | 0 | 0 | 3 | ND | 4 | 4 |
| 35–37° C. | A | 0 | 0 | 0 | 3 | 4 | 5 | ND | 5 | 5 |
| | B | 0 | 0 | 0 | 1 | 3 | 4 | ND | 5 | 5 |
| | C | 0 | 0 | 0 | 1 | 3 | 4 | ND | 5 | 5 |
| | D | 0 | 0 | 0 | 0 | 2 | 3 | ND | 4 | 5 |

*ND = Not done.

TABLE 5

Visual scoring of mold formation in 25% feed held in petri dishes.

| Incubation Temperature | Treatment | Visual score on days post-addition of water | | | | | | | | |
|---|---|---|---|---|---|---|---|---|---|---|
| | | 1 | 2 | 3 | 4 | 5 | 6 | 7 | 8 | 9 |
| Room Temperature | A | 0 | 0 | 0 | 0 | 4 | 5 | ND* | 5 | 5 |
| | B | 0 | 0 | 0 | 0 | 1 | 3 | ND | 4 | 4 |
| | C | 0 | 0 | 0 | 0 | 2 | 3 | ND | 3 | 4 |
| | D | 0 | 0 | 0 | 0 | 0 | 1 | ND | 3 | 4 |
| 35–37° C. | A | 0 | 0 | 0 | 4 | 5 | 5 | ND | 5 | 5 |
| | B | 0 | 0 | 0 | 2 | 3 | 3 | ND | 3 | 4 |
| | C | 0 | 0 | 0 | 1 | 3 | 3 | ND | 4 | 4 |
| | D | 0 | 0 | 0 | 1 | 2 | 2 | ND | 3 | 4 |

*Not done.

The foregoing experiments reported in Examples I and II illustrate the antifungal activity of natamycin associated with animal feedstuffs, despite a prolonged exposure to aqueous environments of up to about 53% water. The samples including natamycin generally showed a dose response delay in the initiation and a reduced growth of molds, compared with the control samples. This finding of efficacy is surprising and unexpected in view of the prior art discussed above.

Natamycin is available under the trade name Delvocid® produced by the Gist Brocades company of the Netherlands. As supplied, Delvocid® contains about 50% natamycin. Natamycin may be dissolved with stirring at room temperature for about five minutes by adding about 2 to 25 gm, for example, of natamycin crystals to propylene glycol or methanol, or other solvent in which natamycin will dissolve. Because of natamycin's limited solubility, it will not completely go into solution, but may form a suspension. An optimal volume for suspending 2 to 25 gm of natamycin is approximately 30–60 ml. Preferably, such an amount of natamycin will be added to about one pound of a conventional premix, and will not overly wet it. The one pound of premix is then added to about one ton of feed.

Preferable premix compositions include rice hulls which are readily available from grain brokers, or the J. B. Hunt Company in Rodgers, Arkansas. Rice hulls are preferred because of their relatively low price; however, other premix materials may be used, such as calcium carbonate (limestone), soybean mill feed, or corn cob fractions, as examples. other premix materials may be utilized, but they must be inert as are the other suggested premix materials. The natamycin suspension is added to the premix material, and then mixed for about 10 minutes in a standard horizontal or vertical blender. Alternatively, natamycin in a dry powder form could be directly blended into feed; however, more extended mixing times would be required.

The preferred dosage range of natamycin in the finished feed is about 0.000055 to 0.011 weight percent (about 0.5 to 100 gm per ton of feed), preferably about 0.000055 to 0.0055 weight percent (about 0.5 to 50 gm per ton), more preferably about 0.00022 to 0.0028 weight percent (about 2 to 25 gm per ton), and most preferably about 0.00088 to 0.0017 weight percent (about 8 to 15 gm per ton). This dose of natamycin is prepared as discussed above by suspending it in a appropriate carrier solvent and adding it to about one pound of a premix carrier. There is no evidence that use of the higher dosage ranges would cause any toxicity problems in treated animals; however the considerations of cost and undue wetting of the premix carrier may become significant. It is contemplated that other polyene macrolide compounds, particularly tetraenes such as lucensomycin, arenomycin B, tetramycin, tetrin A or tetrin B may be equivalent to natamycin. Because the premix will be added to one-ton charges of feed, the correspondency between resulting concentration in the feed is such that about one gram of natamycin added to the premix yields about a one ppm concentration of natamycin in the feed (about 0.0001 weight percent). Thus 10 gm natamycin added to 1 lb of premix, which in turn is added to a ton of feed, yields about a 10 ppm effective natamycin concentration.

Feed is prepared, conventionally, in a large bin or mixer in which the feed ingredients are added in a descending weight order according to their prevalence in the ultimate feed mixture. Thus, cracked grain would be the primary ingredient. Minor ingredients are then added. Micro-ingredients are added last. These include vitamins, drugs, growth promoters, antibiotics, and also antifungal compounds such as natamycin. Thus, natamycin is one of the micro-ingredients and it is added to the feed in the final blending step. The feed is blended for conventional time periods. Individual farmers can also mix a natamycin premix with feed but this would require a small mixer such as is conventionally run by the power takeoff of a tractor. Five minutes is usually sufficient to blend natamycin in its premix form with small batches of feed materials.

The feed comprising the natamycin is fed to animals at standard feed dosage ranges and rates. No changes in feeding patterns are necessitated by the inclusion of natamycin into the animal feedstuff. Natamycin is suitable for incorporation in the feed for swine, poultry, turkeys, dairy animals, horses, dogs, rabbits, fish and other animals which are not specifically mentioned.

The following example illustrates the preparation of a natamycin treated premix:

EXAMPLE III

PROCEDURE

In 300 ml of propylene glycol add 100 gm of natamycin. Stir at room temperature for about five minutes to dissolve some of the natamycin and to form a suspension with the remaining natamycin. Then take 4 lb of dried rice hulls and place in a small, conventional horizontal mixer. Pour the 300 ml of natamycin solution/suspension over the rice hulls in the mixer and mix for ten minutes. By this technique, enough natamycin-treated premix has been prepared to treat about 4 tons of feed in order to achieve about a 25 ppm natamycin feedstuff (about 0.0028 weight percent).

The following examples represent various animal feeds that incorporate natamycin premix as prepared by the method of Example III above.

EXAMPLE IV

| Swine Feed Formulation | |
|---|---|
| Ingredient | (lb) |
| Ground yellow corn | 1,643 |
| Wheat, hard winter | — |
| Ground oats | — |
| Wheat middlings | — |
| Soybean meal, 44% | 285 |
| Meat and bone meal, 50% | — |
| Tankage | — |
| L-lysine, 78% L-lysine | — |
| Calcium carbonate (limestone) | 17 |
| Dicalcium phosphate | 25 |
| Salt | 10 |
| Vitamin - trace mineral mix | 20 |
| Natamycin premix | 2 |
| Total | 2,002 |

EXAMPLE V

| Dog Food Formulation | |
|---|---|
| Ingredient | (%) |
| Meat and bone meal, 55% protein | 8.00 |
| Fish meal, 60% protein | 5.00 |
| Soybean oil meal | 12.00 |
| Soybean grits | — |
| Wheat germ oil | 8.00 |
| Dried skim milk | 4.00 |
| Wheat | 25.50 |
| Corn flakes | 26.00 |
| Wheat bran | 4.00 |
| Wheat flakes | — |
| Fat, edible | 2.00 |
| Steamed bone meal | 2.00 |
| Dried brewers' yeast | 2.00 |
| Dried fermentation solubles | 1.00 |
| Trace mineralized salt | 0.50 |
| Fortify one ton of the above with: | |
| Vitamin A | 5 million IU |
| Vitamin D | 1.5 million IU |

| -continued | |
|---|---|
| Dog Food Formulation | |
| Niacin | 30 gm |
| Riboflavin | 3 gm |
| Calcium pantothenate | 10 gm |
| B₁₂ | 10 gm |
| Natamycin premix | 1 lb |

EXAMPLE VI

| Lamb Food Formulation | |
|---|---|
| Ingredient | (lb) |
| Ground shelled corn | 1175 |
| Soybean meal | 25 |
| Linseed meal | — |
| Hay (high quality) | 800 |
| Hay (medium quality) | — |
| Corn silage | — |
| Oats silage | — |
| Molasses | — |
| Limestone | — |
| Dicalcium phosphate | — |
| Urea, dry | — |
| Dehydrated alfalfa meal | — |
| Ground ear corn | — |
| Oat hulls | — |
| Natamycin premix | 0.5 |
| Total | 2000.5 |

EXAMPLE VII

| Breeder Duck Feed Formulation | |
|---|---|
| Ingredient | (lb) |
| Yellow Corn | 1309.5 |
| Soybean meal, 48.5% | 318.0 |
| Meat and bone meal, 50% | 76.0 |
| Fish meal, 60% | 60.0 |
| Dried whey, delactosed | 45.0 |
| Animal-vegetable fat | — |
| Dicalcium phosphate | — |
| Limestone | 112.0 |
| Salt | 6.0 |
| Vitamin mix | 20.0 |
| Trace mineral mix | 2.0 |
| Methionine, hydroxy analogue | 1.5 |
| Pellet binder | 50.0 |
| Natamycin premix | 2.0 |
| Total | 2002.0 |

EXAMPLE VIII

| Broilers and Roasters Feed Formulation | |
|---|---|
| Ingredient | (lb) |
| Yellow corn | 1503.5 |
| Soybean meal, 48% | 210.0 |
| Meat and bone meal, 50% | 143.0 |
| Fish meal, 62% | — |
| Corn gluten meal, 60% | 90.0 |
| Fermentation by-product | — |
| Animal-vegetable fat | 34.0 |
| Salt | 7.0 |
| Vitamin mix | 10.0 |
| Trace mineral mix | 2.0 |
| Methionine, DL | 0.5 |
| Natamycin premix | 2.0 |
| Total | 2002.0 |

EXAMPLE IX

| Horse Feed Formulation | |
|---|---|
| | (%) |
| A. Off Season Grain Mix | |
| Crimped Oats | 50.0 |
| Cracked yellow corn | 14.0 |
| Wheat bran | 10.0 |
| Alfalfa leaf meal | 5.0 |
| Linseed meal | 7.5 |
| Iodized salt | 0.5 |
| Dicalcium phosphate | 0.5 |
| Molasses | 12.4 |
| Natamycin premix | 0.1 |
| Total | 100.0 |
| B. Horse Breeding Grain Mix | |
| Crimped oats | 54.0 |
| Crimped barley | 20.0 |
| Cracked yellow corn | 10.0 |
| Wheat bran | 10.0 |
| Linseed meal | 4.9 |
| Dicalcium phosphate | 0.5 |
| Iodized salt | 0.5 |
| Natamycin premix | 0.1 |
| Total | 100.0 |
| C. Lactation, Mares, Grain Mix | |
| Crimped barley | 30.0 |
| Crimped oats | 30.0 |
| Cracked yellow corn | 10.0 |
| Soybean meal | 10.0 |
| Wheat bran | 10.0 |
| Molasses | 6.9 |
| Dicalcium phosphate | 1.0 |
| Iodized salt | 1.0 |
| Natamycin premix | 0.1 |
| Total | 100.0 |
| D. Suckling Foal Grain Mix | |
| Crimped oats | 70.0 |
| Linseed meal | 11.0 |
| Wheat bran | 10.0 |
| Molasses | 6.9 |
| Dicalcium phosphate | 1.0 |
| Iodized salt | 1.0 |
| Natamycin premix | 0.1 |
| Total | 100.0 |

EXAMPLE X

| Lactating Dairy Cow Formulation | |
|---|---|
| | (%) |
| A. Corn only | |
| Ground shelled corn | 77.0 |
| Soybean meal, 44% | 15.0 |
| Molasses | 4.95 |
| Trace mineralized salt | 1.0 |
| Calcium sulfate, 22% S, 27% Ca | — |
| Sodium phosphate, 25% P | 0.35 |
| Dicalcium phosphate, 23% Ca, 18% P | 1.3 |
| Ground limestone, 38% Ca | — |
| Magnesium oxide, 54% Mg | 0.15 |
| Vitamin A, D, E premix | 0.2 |
| Natamycin premix | 0.05 |
| B. Corn and Small Grains | |
| Ground shelled corn | 55.1 |
| Oats or barley | 25.0 |
| Soybean meal, 44% | 12.0 |
| Molasses | 4.95 |
| Trace mineralized salt | 1.0 |
| Calcium sulfate, 22% S, 27% Ca | — |
| Sodium phosphate, 25% P | 0.35 |
| Dicalcium phosphate, 23% Ca, 18% P | 1.2 |
| Ground limestone, 35% Ca | — |
| Magnesium oxide, 54% Mg | 0.15 |
| Vitamin A, D, E premix | 0.2 |
| Natamycin premix | 0.05 |
| C. Corn and Mid-Protein Feedstuffs | |

-continued

| Lactating Dairy Cow Formulation | (%) |
|---|---|
| Ground shelled corn | 66.1 |
| Brewers' or distillers' grains | 20.0 |
| Soybean meal, 44% | 6.0 |
| Molasses | 4.95 |
| Trace mineralized salt | 1.0 |
| Calcium sulfate, 22% S, 27% Ca | — |
| Sodium phosphate, 25% P | 0.4 |
| Dicalcium phosphate, 23% Ca, 18% P | 1.15 |
| Ground limestone, 38% Ca | — |
| Magnesium oxide, 54% Mg | 0.15 |
| Vitamin A, D, E premix | 0.2 |
| Natamycin premix | 0.05 |

From the foregoing descriptions and examples, one skilled in the art can easily ascertain the essential characteristics of this invention, and without departing from the spirit and scope thereof can make various changes and modifications of the invention to adapt it to various usages and conditions. Thus the preceding preferred specific embodiments are, therefore, to be construed to be merely illustrative of and not limitative of the disclosure in any way.

What I claim is:

1. A method for improving animal feed which contains moisture to prevent or inhibit the onset of and reduce fungal or mold growth in the feed prior to consumption by an animal to thereby prevent or inhibit mycotoxicoses in the animal, which comprises blending about 0.000055 to 0.011 weight percent of natamycin into the animal feed.

2. A method according to claim 1 wherein the natamycin is dry blended into the animal feed in admixture with an inert carrier.

3. A method according to claim 1 wherein the animal feed contains an initial moisture content of about 7 to 30 weight percent.

4. A method according to claim 1 wherein the natamycin is added to the feed in an amount of about 0.00088 to 0.0017 weight percent.

5. A method according to claim 2 wherein the inert carrier is one or more members selected from the group consisting of rice hulls, calcium carbonate, soybean mill feed, and corn fractions.

6. A method according to claim 2 wherein the resulting animal feed comprises about 70 to 93 weight percent of a cracked or ground grain, having an average particle size of about 1/32nd of an inch, or less, to ⅛th inch; about 7 to 30 weight percent of water; and about 0.05 to 0.15 weight percent of a premix comprising about 0.5 to 100 grams of natamycin admixed with about one to three pounds of an inert carrier per ton of feed.

* * * * *